(12) United States Patent
Kozisek (10) Patent No.: US 7,792,538 B2
(45) Date of Patent: Sep. 7, 2010

(54) SYSTEM AND METHOD FOR ENABLING SUBSCRIBERS OF A COMMUNICATIONS CARRIER TO ACCESS A NETWORK OF WIRELESS ACCESS POINTS OF SUBSCRIBERS OF OTHER COMMUNICATIONS CARRIERS

(75) Inventor: Steven E. Kozisek, Leawood, KS (US)

(73) Assignee: Embarq Holdings Company, LLC, Overland Park, KS (US)

( * ) Notice: Subject to any disclaimer, the term of this patent is extended or adjusted under 35 U.S.C. 154(b) by 567 days.

(21) Appl. No.: 11/787,553

(22) Filed: Apr. 17, 2007

(65) Prior Publication Data

US 2008/0262975 A1 Oct. 23, 2008

(51) Int. Cl.
*H04Q 7/20* (2006.01)
(52) U.S. Cl. .............. 455/507; 455/432.1; 455/432.2; 455/433; 455/435.3; 455/422.1; 370/310; 370/329; 370/328
(58) Field of Classification Search .............. 455/507, 455/500, 509, 512, 514, 515, 432.1, 432.2, 455/433, 435.1, 435.2, 435.3, 422.1, 403, 455/445, 550.1, 552.1, 551; 370/310, 329, 370/328, 338
See application file for complete search history.

(56) References Cited

U.S. PATENT DOCUMENTS

| 5,943,619 | A | * | 8/1999 | Coyne et al. ............... 455/433 |
| 7,444,669 | B1 | | 10/2008 | Bahl et al. | |
| 2002/0102973 | A1 | * | 8/2002 | Rosenberg .................. 455/432 |
| 2002/0191763 | A1 | | 12/2002 | Bates et al. | |
| 2005/0154787 | A1 | | 7/2005 | Cochran et al. | |
| 2005/0208950 | A1 | | 9/2005 | Hasse | |
| 2005/0282523 | A1 | | 12/2005 | Yoshihara et al. | |
| 2006/0021022 | A1 | | 1/2006 | Krishna et al. | |
| 2006/0064497 | A1 | | 3/2006 | Bejerano et al. | |
| 2006/0133330 | A1 | | 6/2006 | Chin | |
| 2006/0146752 | A1 | | 7/2006 | Jang et al. | |
| 2007/0112948 | A1 | | 5/2007 | Uhlik | |
| 2007/0288554 | A1 | | 12/2007 | Komlenic et al. | |

OTHER PUBLICATIONS

Restriction Requirement date mailed Nov. 3, 2009 in U.S. Appl. No. 11/787,551.

(Continued)

*Primary Examiner*—Keith T Ferguson
(74) *Attorney, Agent, or Firm*—Sonnenschein Nath & Rosenthal LLP (57) ABSTRACT

A system and method for enabling subscribers of a first communications carrier to communicate over wireless access points of subscribers hosted by a second communications carrier. In response to receiving a request signal from a wireless device via a wireless access point within a first network of wireless access points, a determination may be made as to whether the user is a first subscriber of the first communications carrier. In response to determining that the user is not a first subscriber, a determination as to whether the user is a second subscriber having a subscription agreement enabling the second subscriber to communicate over the communications network via the first network of wireless access points. The wireless device may be enabled to access the wireless access point in response to determining that the user is a second subscriber having a subscription agreement.

19 Claims, 5 Drawing Sheets

OTHER PUBLICATIONS

Response filed Nov. 24, 2009 to Restriction Requirement date mailed Nov. 3, 2009 in U.S. Appl. No. 11/787,551.

Non-Final Rejection date mailed Jan. 4, 2010 in U.S. Appl. No. 11/787,551.

"Supernode100—Resource Aggregator," Mushroom Networks, Inc., 2004-2006; retrieved from the Internet at URL: <http://www.mushroomnetworks.com/v7/supernode100.htm> on Feb. 1, 2007 (original publication date unknown) (2 pages).

"BPX100—Remote Management Suite," Mushroom Networks, Inc. 2004-2006; retrieved from the Internet at URL: <http://www.mushroomnetworks.com/v7/bpx100.htm> on Feb. 1, 2007 (original publication date unknown) (2 pages).

"CPX100—for Local Exchange Carrier Deployments," Mushroom Networks, Inc. 2004-2006; retrieved from the Internet at URL: <http://www.mushroomnetworks.com/v7/cpx100.htm> on Feb. 1, 2007 (original publication date unknown) (2 pages).

"APX10—for Access Point Aggregator," Mushroom Networks, Inc. 2004-2006; retrieved from the Internet at URL: <http://www.mushroomnetworks.com/v7/apx10.htm> on Feb. 1, 2007 (original publication date unknown) (2 pages).

"What's FON," FON Community; retrieved from the Internet at URL: <http://en.fon.com/info/whats_fon.php> on Feb. 1, 2007 (original publicaiton date unknown) (3 pages).

Response filed Feb. 23, 2010 to Non-Final Rejection date mailed Jan. 4, 2010 in U.S. Appl. No. 11/787,551.

Non-Final Rejection date mailed May 25, 2010 in U.S. Appl. No. 11/787,552.

* cited by examiner

SYSTEM AND METHOD FOR ENABLING SUBSCRIBERS OF A COMMUNICATIONS CARRIER TO ACCESS A NETWORK OF WIRELESS ACCESS POINTS OF SUBSCRIBERS OF OTHER COMMUNICATIONS CARRIERS

BACKGROUND

Wireless communications have become pervasive in recent years. At first, telecommunications provided cordless handsets to enable consumers to use a home telephone without being restricted by a telephone cord. Mobile telephones further provided freedom to consumers by enabling them to use a telephone while away home. Finally, computers that were once attached to a wall socket to communicate over the Internet became wireless through the use of wireless routers and other consumer wireless access points (e.g., home consumer wireless routers).

Mobility further expanded by commercial wireless access points becoming available and proliferating throughout society. Broadband wireless access points have become available at coffee shops, airports, hotels, and other commercial locations to resell wireless access. These commercial wireless access points have become available for a number of reasons, including attracting computer users who enjoy accessing the Internet and generating network access fees. A commercial establishment may become a reseller of network access for a communications carrier by providing reseller wireless access points at the commercial establishment. For example, Starbucks® coffee shops are resellers of T-Mobile® communications services. Each of these commercial companies financially benefit when users access the T-Mobile® communications network via the wireless access points within Starbucks®.

One situation that has developed by home consumer wireless routers becoming so pervasive is non-subscribers accessing wireless routers and network services being paid by their consumer subscriber neighbors. This situation arises when a consumer subscriber does not password protect access to the wireless router. In the case of a non-subscriber's unauthorized access of a subscriber's wireless router, this act is considered theft of wireless communications services. In the case where the subscriber knowingly allows for non-subscribers to access the wireless router, such an act is generally prohibited by terms and conditions of consumer service agreements between the service provider and the consumer subscriber.

Another situation that has developed is one where a third-party, non-communications carrier sells wireless routers that are connected to network connections of subscribers of communications carriers. The third-party, non-communications carrier sells subscription agreements to customers to access a network via these wireless routers. The customers of the third-party, non-communications carrier are able to connect to the network via the wireless routers without having to pay the communications carriers, thereby saving money. However, such configurations and subscription agreements are against the terms and conditions of subscription agreements of the subscribers of the communications carriers because, in effect, those subscribers providing access to non-subscribers are operating as resellers of network access. In some cases, the subscribers that provide access to non-subscribers are paid by the third-party, non-communications carrier to provide access to subscribers of the third-party, non-communications carrier network.

Commercial companies that provide telecommunications and other wireless services (eg., wireless Internet services via commercial wireless routers at office buildings) to its employees use conventional communications devices and systems. For example, many employers provide its employees with mobile telephones and broadband wireless communications cards, in the case of wireless Internet access. Commercial employees who service consumer residential properties are often out-of-range of mobile communications services, which is a problem when they are to handle ongoing calls and communications with other employees of the company. For example, a garage door installation team might be working on a residential property at a new subdivision that is remote or has limited communications services from existing telecommunications services. An employee attempting to notify the garage door installation team might be incapable of notifying the team of another job or time remaining to complete an installation, which is problematic from a work-scheduling standpoint.

While wireless routers have enabled computer users to access the Internet with unprecedented freedom, bandwidth of these routers is relatively slow. Today's technology provides users with 50 megabit (MB) per second communications. However, these speeds are relatively slow when downloading large amounts of content, such as a movie.

A number of third-party bandwidth expansion products have been developed to increase bandwidth to those who purchase these bandwidth expansion products. One such product provides a subscriber with a device to aggregate bandwidth from local wireless routers. Essentially, communication with each local wireless router is performed in parallel. However, the act of bandwidth pooling by consumer non-resellers is also considered a violation of the terms and conditions of a communications carrier's subscription agreement because non-subscribers or users other than the subscriber who owns the wireless router are provided access to the wireless routers and telecommunications services without paying a telecommunications carrier for that access or expanded access.

Subscribers of a communications carrier often find themselves traveling to locations that are not serviced by their communications carrier. Other communications carriers, however, may service these locations. As previously described, terms and conditions of subscription agreements of communications carriers do not allow anyone other than the subscriber to access wireless access points of the subscribers. Therefore, when a subscriber is traveling, he or she is limited to accessing a wireless network via a commercial reseller of wireless network access, which may be expensive.

SUMMARY

To overcome the problem of subscribers of a communications carrier traveling to a location not serviced by his or her communications carrier, the communications carrier may have an inter-network roaming agreement with other communications carriers that enables subscribers of the communications carriers to have a subscription agreement having terms and conditions that provide for network access via wireless access points of respective subscribers. This subscription agreement provides for inter-network roaming of subscriber wireless access points of other communications carriers. For example, a subscriber of a communications carrier may access a communications network via a network of wireless access points of subscribers of another communications carrier.

An embodiment of a system in accordance with the principles of the present invention may include a system for enabling commercial subscribers of a first communications carrier to communicate over wireless access points hosted by a second communications carrier including a first storage unit configured to store at least one first database including information identifying subscribers and associated subscriber subscription agreements of a first communications carrier. A second storage unit may be configured to store at least one second database including information identifying subscribers and associated subscriber subscription agreements of a second communications carrier. The first communications carrier may have a first network of wireless access points associated with first subscribers. The second communications carriers may have a second network of wireless access points associated with second subscribers of the second communications carrier. At least one of the subscription agreements may enable the first subscribers to access the second network of wireless access points of the second subscribers of the second communications carrier to communicate over the communications network. A first computing system may be in communication with the first storage unit and first network of wireless access points of the first subscribers. A second computing system may be in communication with the second storage unit, first computing system, and second network of wireless access points. The second computing system may be configured to (i) receive a request signal from a wireless device of a user via a wireless access point within the second network of wireless access points of second subscribers to communicate over the communications network, (ii) query the second database(s) stored in the second storage unit to determine whether the user is a second subscriber of the second communications carrier, (iii) in response to determining that the user is not a second subscriber, communicate with the first computing system to determine whether the user is a first subscriber having a subscription agreement enabling the first subscriber to communicate over the communications network via the second network of wireless access points of second subscribers, and (iv) enable the wireless device to access the wireless access point in response to determining that the user is a first subscriber having a subscription agreement enabling communication over the communications network via the second network of wireless access points of second subscribers.

An embodiment of a method in accordance with the principles of the present invention may include a method for enabling subscribers of a first communications carrier to communicate over wireless access points of subscribers hosted by a second communications carrier. The method may include receiving a request signal from a wireless device of a user via a wireless access point within a first network of wireless access points of first subscribers to communicate over the communications network. At least one first database may be queried to determine whether the user is a first subscriber of the first communications carrier. In response to determining that the user is not a first subscriber, a determination may be made to determine whether the user is a second subscriber having a subscription agreement enabling the second subscriber to communicate over the communications network via the first network of wireless access points of first subscribers. The wireless device may be enabled to access the wireless access point in response to determining that the user is a second subscriber having a subscription agreement enabling communication over the communications network via the first network of wireless access points of first subscribers.

BRIEF DESCRIPTION OF THE DRAWINGS

Illustrative embodiments of the present invention are described in detail below with reference to the attached drawing figures, which are incorporated by reference herein and wherein.

DETAILED DESCRIPTION OF THE DRAWINGS

Figure 1:
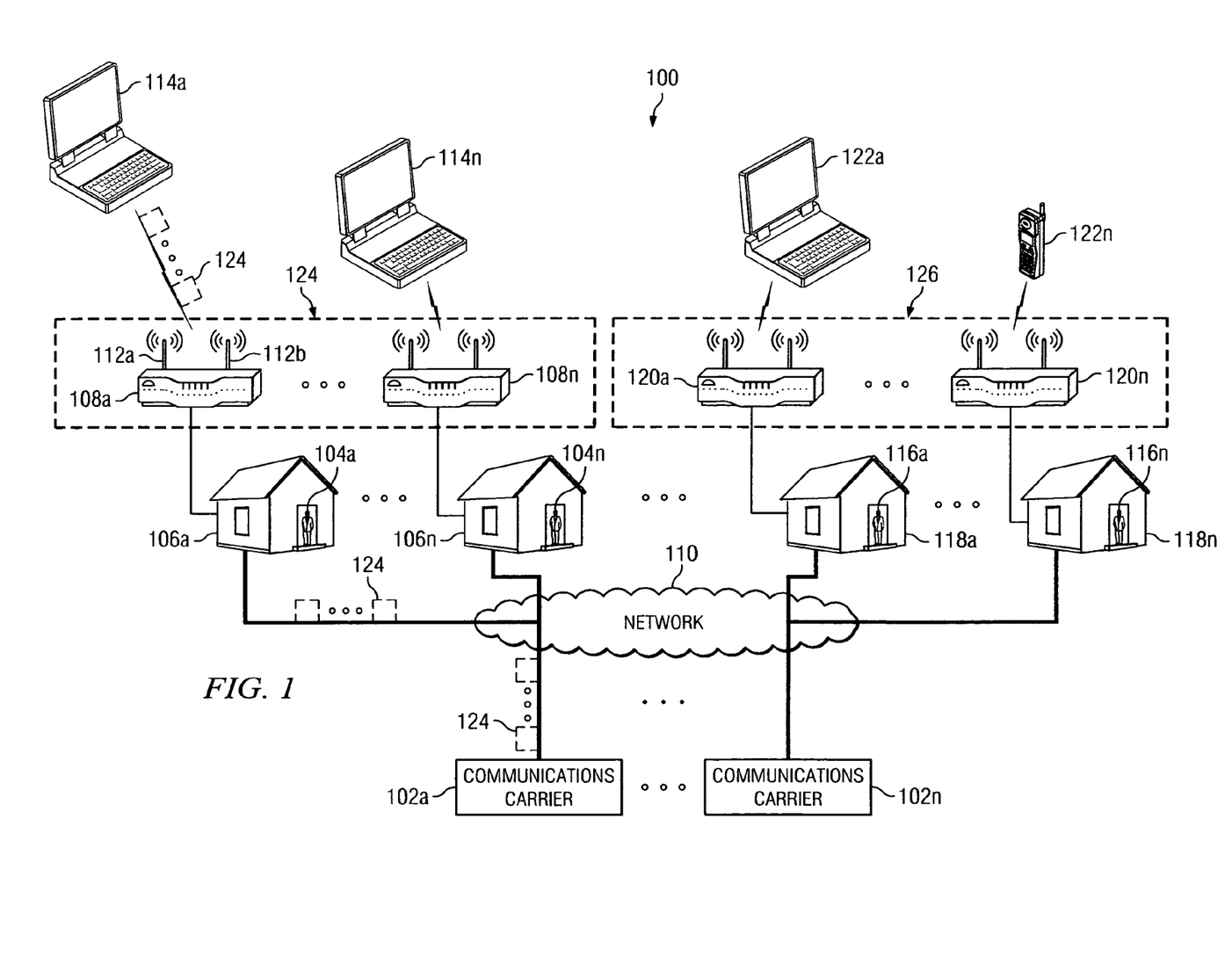
FIG. 1 is an illustration of a system for communications carriers to provide wireless communications services to subscribers of each communications carrier.

FIG. 1 is an illustration of a system 100 for communications carriers 102a-102n (collectively 102) to provide wireless communications services to subscribers of each communications carrier 102a and 102n, respectively. The configuration of the systems 100 enables the subscribers to provide intra-network roaming, inter-network roaming, and aggregated wireless communications services. Subscribers 104, residing at residential locations 106a-106n (collectively 106), such as a house, may own wireless access points 108a-108n (collectively 108). The wireless communications services may be in the form of broadband or other communications protocols (eg., voice over Internet Protocol (VoIP)). The wireless access points 108 may be wireless routers or any other wireless access points that enable users to have wireless access to a communications network 110 (eg, the Internet). A wireless access point 106a may include multiple antennas 112a and 112b (collectively 112) that are utilized to communicate with a wireless device 114a of a subscriber 104a within wireless broadcast range of the wireless access point 108a at the residential location 106a. A communications path (not shown), including a transceiver and other communications devices as understood in the art, may be included within the wireless access point 108a for communicating via the antennas 112.

The subscribers 104 of the communications carrier 102a may communicate with the wireless access points 106 using wireless devices 114a-114n (collectively 114). The wireless devices 114 may include personal computers, wireless telephones, or other wireless devices capable of communicating over a communications network 110 via wireless access points 108. Similarly, subscribers 116a-116n of the communications carrier 102n residing in residential locations 118a-118n, respectively, may communicate with wireless access points 120a-120n (collectively 120), respectively, using wireless devices 122a-122n (collectively 122), respectively.

In communicating with wireless access point 108a, the wireless device 114a may wirelessly communicate using data packets 124 using a wireless communications protocol, such as WiFi WiHX, or any other wireless communications protocol for communicating voice and/or data over the communications network 110. The data packets 124 may be communicated via the wireless access point 108a and over the communications network 110.

In accordance with the principles of the present invention, the collective wireless access points 108 hosted by the communications carrier 102a and collective wireless access points 120 hosted by the communications carrier 102n form subscriber networks 124 and 126, respectively of wireless access points (ie, wireless access points 108 and 120). The subscriber networks 124 and 126 may be individually managed and serviced by the respective communications carriers 102a and 102n. In one embodiment, the subscribers 104 of the communications carrier 102a may have a subscription agreement that has terms and conditions that provide for wireless access to wireless access points 108 in the subscriber network 124 of other subscribers of the communications carrier 102a ("intra-network roaming" subscription agreement). In another embodiment, a sharing or partnership agreement between communications carriers 102a and 102n may provide for subscribers 104 and 116 of the respective communications carriers 102a and 102n to access the communications network 110 via the subscriber networks 124 and 126 of both communications carriers 102a and 102n. If such a sharing agreement exists, then a subscription agreement having terms and conditions that enable subscribers of one communications carrier may provide for accessing a network via wireless access points of subscribers of the partner communications carrier that is part of the sharing agreement ("inter-network roaming" subscription agreement). For example, if Embarq™ and SBC® have a sharing agreement, each of the subscribers of the two communications carriers who have a subscription agreement that enables wireless access of the subscriber networks of both carriers may communicate over the communications network via wireless access points of both communications carriers.

In yet another embodiment, commercial subscribers, which include employees and associated workers of business entities, may have a subscription agreement with a wireless carrier that provides for wireless access to wireless access points of consumer and/or commercial subscribers of the communications carrier ("commercial intra-network roaming" subscription agreement). It should be understood that commercial subscription agreements may be made with the commercial entity or employees and associated workers of the commercial entity in a manner that provides for a group discount for the commercial subscribers. For example, a commercial subscriber having an intra-network roaming subscription agreement with a communications carrier enables the commercial subscriber using the wireless device to access a network of wireless access points of other subscribers of the communications carrier to communicate over a communications network. The commercial subscription agreement may also enable the commercial subscribers to access wireless access points of other commercial subscribers. If a sharing agreement exists between the communications carrier and another communications carrier, then the commercial subscriber may have a subscription agreement that enables inter-network roaming between subscriber networks of the two communications carriers.

In accordance with the principles of the present invention, wireless access points 108 and 120 may have private communications interfaces and public wireless communications interfaces. In one embodiment, each of the private and public wireless communications interfaces of the wireless access points may be in communication with respective antennas. Alternatively, both private and public wireless communications interfaces of the wireless access points may be in communication with a single antenna. The private wireless communications interface may be one that a subscriber 104a at the residential location 106a may access, but no others subscribers may access. The public wireless communications interface may be an interface that both the subscriber 104a located at the residential location 106a may use and a subscriber other than one located at the residential location 106a may utilize. In other words, subscribers having an intra-network or inter-network roaming subscription agreement may access any of the wireless access points 108 and 120 that are within communication range of their respective wireless devices. Of course, a subscriber 104a who owns the wireless access point 108a may be given priority over other subscribers accessing their wireless access point 108a. For example, if the subscriber 104a who owns the wireless access point 108a decides to download a movie from the network 110, that movie download would be given priority over other subscribers who are accessing the wireless access point 108a.

In one embodiment, the communications carriers 102a and 102n may provide a subscription agreement that allows for subscribers to aggregate bandwidth from multiple wireless access points 108 and 120 within the subscriber networks 124 and 126. In this case, if a wireless device, such as wireless device 122a operated by a subscriber 116a who has a subscription agreement that enables bandwidth aggregation, is within range of multiple wireless access points 120a and 120n, then the wireless device 122a may use unused bandwidth from the wireless access points 120a and 120n.

As shown, each of the residential locations is provided a certain bandwidth. More specifically, if the subscriber 116a at residential location 118a has a 5 MB bandwidth subscription agreement and subscriber 116n at residential location 118n has a 30 MB bandwidth subscription agreement, then aggregation of the bandwidths of the two wireless access points 120a and 120n may provide for a potential 35 MB bandwidth. The service bandwidths are paid for by each of the respective subscribers, where the subscriber 116a may pay less for a 5 MB bandwidth than the subscriber 116n with a 30 MB bandwidth. The same wireless bandwidth aggregation principles may apply to commercial subscribers.

Figure 2:
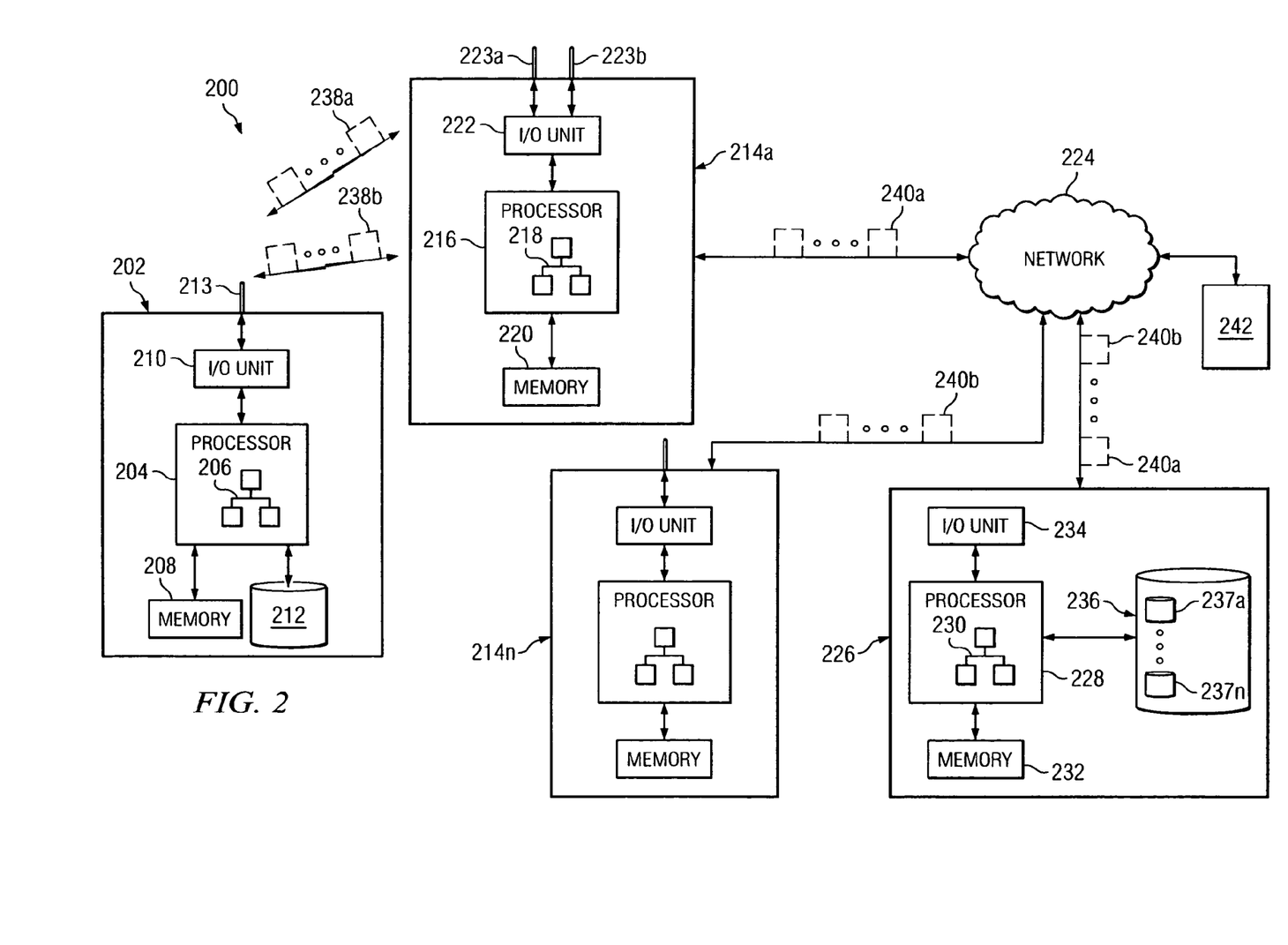
FIG. 2 is an illustration of a system showing components within the system for subscribers to access a communications network via a network of wireless access points of subscribers of the communications carrier.

FIG. 2 is an illustration of a system 200 showing components within the system 200 for subscribers to access a communications network via a subscriber network of wireless access points of subscribers of the communications carrier (intra-network roaming). It should be understood that subscribers of other communications carriers having a subscription agreement that provides subscribers of the other communications carriers to access the network of wireless access points of the communications carrier, then the subscribers of the other communications carriers may access the network of wireless access points of the communications carrier using the components shown in the system 200. Additionally, the system 200 may be configured to provide subscribers the ability to communicate with aggregated wireless communications. The system 200 may include wireless device 202 used by a subscriber. The wireless device 202 may be a personal computer, laptop computer, telephone, game, or any other device that may communicate wirelessly with wireless access points. The wireless device 202 may include a processor 204 that executes software 206 that is utilized for providing functionality for the user of the wireless device 202 and provides wireless communications to enable the user to communicate with remote locations (e.g., servers hosting websites). The processor 204 may be in communication with a memory 208 that is used for storing data and executable software, input/output (I/O) unit 210 that performs communications with remote locations, and storage unit 212 that may store data for the wireless device 202. An antenna 213 may be in communication with the I/O unit 210 for performing wireless communications to remote devices (e&, wireless access points).

A wireless access point 214a may include a processor 216 that executes software 218. The software 218 may provide for both private and public wireless interface communications. The processor 216 may be in communication with memory 220 and I/O unit 222. Antennas 223a and 223b may be in communication with the I/O unit 222 for providing both private and public wireless communications services to subscribers within range of the wireless access point 214a. The software 218 may be configured to enable owners of the wireless access point 214a to have unrestricted access to the wireless access point 214a and have priority for wireless communications with the wireless access point 214a over non-owners (ie, other subscribers who are using the public wireless communications interface to access a network or to aggregate wireless communications bandwidth) accessing the wireless access point 214a. The wireless access point 214a may be in communication with a communications network 224, such as a telecommunications network Internet, or other communications network In one embodiment, the network 224 is a public switched telephone network (PSTM).

A server 226, which may be operated by a communications carrier or other service provider, may include a processor 228 that executes software 230. The processor 228 may be in communication with memory 232, I/O unit 234, and storage unit 236. Data repositories 237a-237n (collectively 237) may be stored on the storage unit 236 and be utilized to store subscriber information of the communications carrier. The data repositories 237 may include one or more databases. In one embodiment, data stored in the data repositories 237 include information about subscribers who have subscription agreements that provide for intra-network roaming wireless access of a communications network via wireless access points of other subscribers. In another embodiment, data stored in the data repositories 237 may include information about other communications carriers, including network addresses for querying whether a subscriber of another communications carrier has a subscription agreement that enables the subscriber to access a network of wireless access points of subscribers of the communications carrier. In yet another embodiment, the subscribers may have a subscription agreement to receive aggregated wireless communications services, such that the subscribers, in addition to being able to access other subscribers' wireless access points, may also simultaneously access multiple wireless access points 214a-214n to receive increased wireless communications bandwidth. In practice, a database having a table, for example, may include fields indicative of terms and conditions of subscription agreements. For example, a table may have fields that identify that subscribers have intra-network roaming, inter-network roaming, and aggregated communications.

The software 230 may be configured to determine when a wireless device is attempting to access a wireless access point 214a to determine whether the wireless device is owned by the owner of the wireless access point. In the case of the wireless access point 214a having a private and public wireless communications interface, the determination may be made to determine whether the wireless device is attempting to access the private or public wireless communications interface. This determination may be made in conjunction with the software 218 executing on the wireless access point 214a. For example, the software 218 being executed by the wireless access point 214a may (i) receive a signal, including information representative of a wireless device (eg, device number or IP address), from a wireless device attempting to communicate with the wireless access point 214a and (ii) communicate the signal to the server 226 of the communications carrier for the software 230 to compare the information representative of the wireless device with the information stored in the data repositories 237 to determine whether the wireless device is communicating with a home wireless access point or a wireless access point of another subscriber of the communications carrier. If the wireless device is not owned by the owner of the wireless access point 214a, then a determination may be made as to whether the user has a subscription agreement that enables him or her to access the network of wireless access points of subscribers of the communications carrier (intra-network roaming). If it is determined that the user is a subscriber of the communications carrier that enables intra-network roaming, then a determination may be made as to whether the subscriber has a subscription agreement that provides for aggregated wireless communications services. If the user is not a subscriber of intra-network roaming or aggregated wireless communications services, then the server 226 may communicate with a server 242 of another communications carrier to determine if the user is a subscriber of the other communications carrier that has subscribed to inter-network roaming communications services and is allowed to communicate over wireless access devices of subscribers of the communications carrier. It should be understood that a global inter-network roaming agreement may exist between the two carriers such that a determination of the user's subscription agreement is not needed once it is determined that the user is a subscriber of the partner communications carrier. Alternatively, a wholesale roaming agreement may exist between communications carriers, where the two carriers account with one another at the end, of a period (eg., monthly and financially account for the difference in the number of minutes used by the subscribers of the carriers that roam using the carriers' networks. It should be understood that other roaming agreements may be utilized in accordance with the principles of the present invention. If the user is not determined to be either an intra-network roaming or inter-network roaming subscriber, then the software 206 and/or 230 may intercept and prevent such unauthorized access and enable the user to pay for limited access (see, FIGS. 6 and 7).

Figure 3:
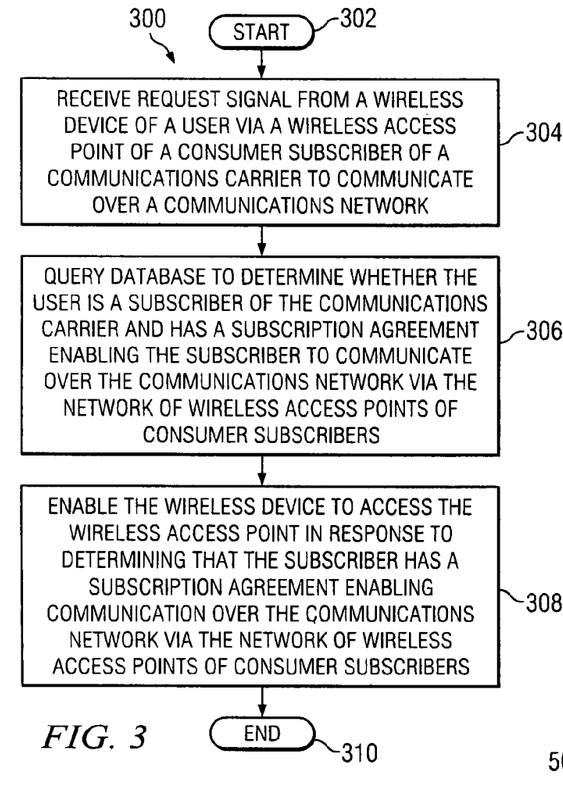
FIG. 3 is a flow diagram of an exemplary process for determining that a consumer or commercial subscriber is a subscriber with rights to roam within the network of wireless access points of a communications carrier and connect to a wireless access point of consumer and/or commercial subscriber of the communications carrier.

FIG. 3 is a flow diagram of an exemplary process 300 for determining that a subscriber has rights to roam within a network of wireless access points of a communications carrier and connect to a wireless access point of a subscriber of the communications carrier (intra-network roaming). The process 300 starts at step 302. At step 304, a request is received from a wireless device of a user via a wireless access point of a consumer subscriber within a network of wireless access points associated with consumer subscribers of a communications carrier. Optionally, a determination that the wireless device of the subscriber is accessing a wireless access point of another consumer subscriber, as opposed to a home wireless access point, within the network of wireless access points may be made. At step 306, a database is queried to determine whether the user is a subscriber of the communications carrier and has a subscription agreement enabling the subscriber to communicate over the communications network via the network of wireless access points of consumer subscribers. The query may include querying to determine whether the subscriber is a commercial subscriber. Still yet, if the wireless device is attempting to access a commercial wireless access point, a query may be made to determine whether the subscriber, consumer or commercial, has rights to access a commercial wireless access point. The wireless device is enabled to access the wireless access point within the network of wireless access points in response to determining that the subscriber has a subscription agreement with the communications carrier enabling access to the network of wireless access points of other consumer and/or commercial subscribers at step 308. Being able to access a wireless access point within a network of wireless access points of other subscribers, in essence, allows a consumer or commercial subscriber to roam within the network of wireless access points hosted by the communications carrier. The process ends at step 310.

Figure 4:
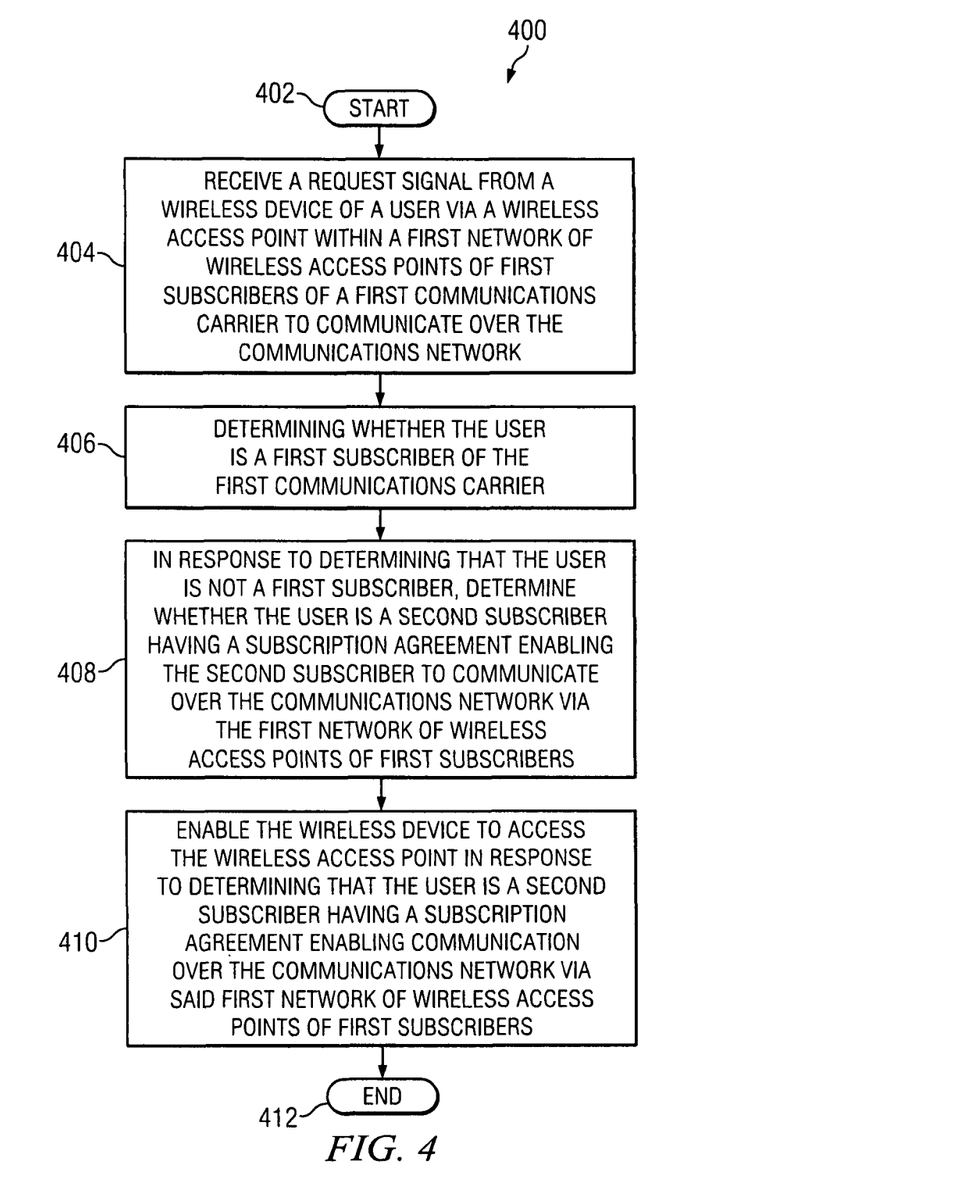
FIG. 4 is a flow diagram of an exemplary process for determining that a subscriber of a first communications carrier has rights to roam within a network of wireless access points of subscribers of a second communications carrier.

FIG. 4 is a flow diagram of an exemplary process 400 for determining that a subscriber of a first communications carrier has rights to roam within a network of wireless access points of subscribers of a second communications carrier (inter-network roaming). The process 400 starts at step 402. At step 404, a request signal is received from a wireless device of a user via a wireless access point within a first network of wireless access points of first subscribers of a first communications carrier to communicate over the communications network The request signal may include information identifying the wireless device and/or the user. At step 406, a determination is made as to whether the user is a first subscriber of the first communications carrier. The determination may be made in response to a query via the wireless access point to a server of the first communications carrier, which, in turn, may access a database to determine whether the user is a first subscriber of the first communications carrier. In response to determining that the user is not a first subscriber of the first communications carrier, a determination is made at step 408 as to whether the user is a second subscriber having a subscription agreement enabling the second subscriber to communicate over the communications network via the first network of wireless access points of first subscribers. At step 410, the wireless device is enabled to access the wireless access point in response to determining that the user is a second subscriber of a second communications carrier having a subscription agreement enabling communication over the communications network via said first network of wireless access points of first subscribers. The process ends at step 412.

If the user is determined not to be a subscriber of either the first or second communications carriers, then additional determinations may be made with other partners of the first communications carrier to determine that the user is not a subscriber with inter-network roaming rights with the first communications carrier. Once it is determined that the user is not a subscriber of the first communications carrier or partner communications carrier that enables its subscribers to access wireless access points of first subscribers of the first communications carrier, then the wireless device may be queried to determine whether the user is willing to pay an access fee for communicating with the wireless access point of the first subscriber. The query may cause the user to be prompted to pay the access fee to enable temporary access to the network via the wireless access point of the first subscriber.

Figure 5:
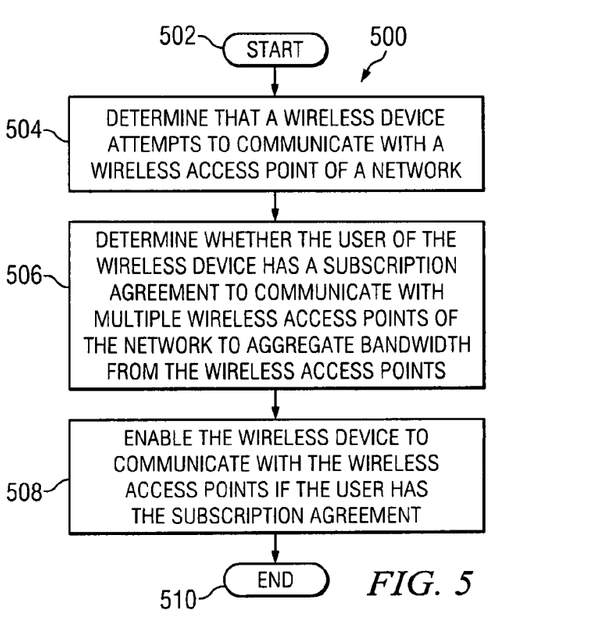
FIG. 5 is a flow diagram of an exemplary process for determining that a user is a subscriber of aggregated wireless communications services.

FIG. 5 is a flow diagram of an exemplary process 500 for determining that a user is a subscriber of aggregated wireless communications services. The process 500 starts at step 502. At step 504, a determination is made that a wireless device attempts to communicate with a wireless access point of a network of wireless access points of other subscribers of the communications carrier. At step 506, a determination is made as to whether the user of the wireless device has a subscription agreement to communicate with multiple wireless access points of the network of wireless access points of the communications carrier to aggregate bandwidth from the wireless access points. At step 508, the wireless device is enabled to communicate with the wireless access points if the user has the subscription agreement allowing for aggregated wireless communication services. The process 500 may be implemented using software and/or hardware of a communications carrier. Both consumer and commercial subscribers may utilize aggregated wireless communications services. The process ends at step 510.

Figure 6:
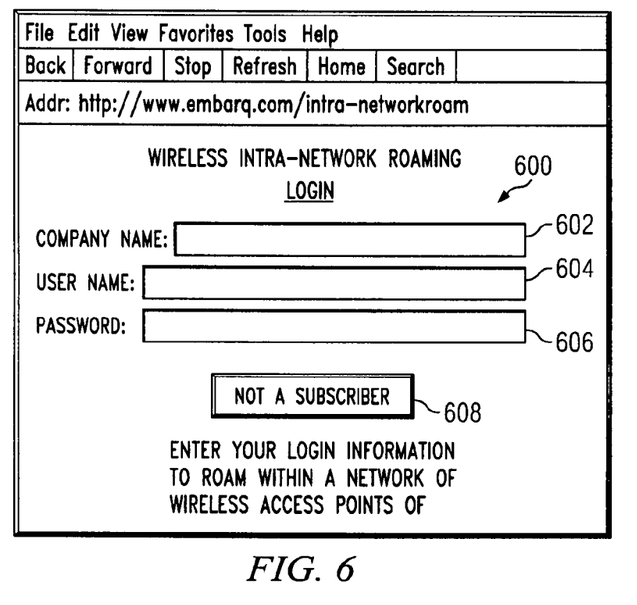
FIG. 6 is a screen shot of an exemplary log-in webpage for a subscriber to access a wireless access point of another subscriber within a network of wireless access points of a communications carrier other than the subscriber's communication carrier.
Figure 7:
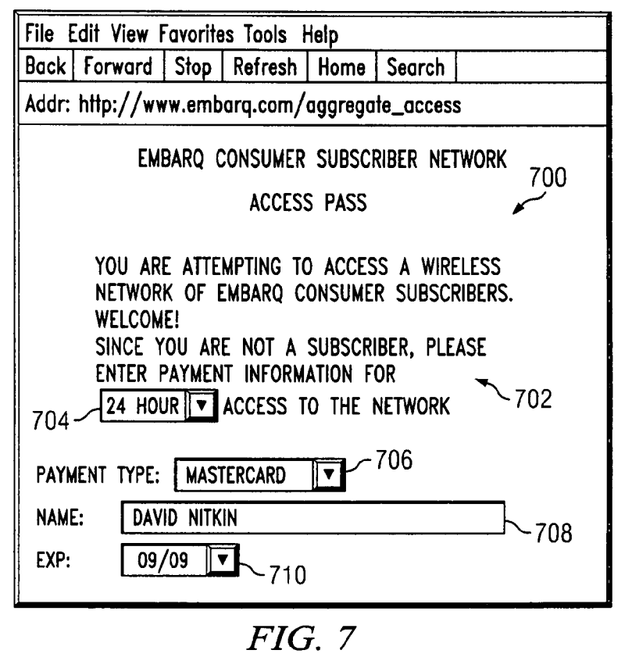
FIG. 7 is a screen shot of an exemplary webpage for enabling a non-subscriber user to temporarily pay for network communications services via another subscriber wireless access point.

FIG. 6 is a screen shot of an exemplary log-in webpage 600 for a subscriber to access a wireless access point of another subscriber within a network of wireless access points of a communications carrier. The same or similar log-in webpage may similarly be utilized for inter-network roaming subscribers. The webpage 600 may be generated and prompted to a user of a wireless device in response to a wireless device of the subscriber attempting to access a wireless access point of the network of wireless access points. If the user is a commercial subscriber, the user may enter his or her company name in a text entry field 602. Alternatively, the webpage 600 may request user name and password input fields 602 and 604, respectively. The system may automatically identify a company for whom the commercial subscriber works in response to the user entering the user name and password, thereby avoiding having to provide a company name text entry field 602. If the user is not a subscriber of intra-network roaming of the communications carrier, then the user may select a soft-button 606 indicating that he or she is not a subscriber. In response, the user may be provided another webpage (FIG. 7) to receive an access pass to temporarily access the network It should be understood that the user may set up automatic login parameters that are requested by a wireless access device of the network to determine whether the subscriber is a subscriber with an intra-network roaming subscription agreement. By setting up the automatic login parameters, the user may avoid having to go through the log-in webpage 600, thereby making the user's experience seamless within the network of consumer and/or commercial subscribers of the communications carrier. It should be understood that interfaces other than Web pages may be utilized to input, store and deliver authentication information from the electronic device to the network so that future access to the network(s) is seamlessly enabled for the user. Interfaces may include software applications or hardware devices that uniquely identify the user and allow authentication and access to the network FIG. 7 is a screen shot of an exemplary webpage 700 for enabling a user who is not a subscriber to temporarily pay for communications services via a wireless access point of a subscriber of a communications carrier. The webpage 700 may provide a message 702 that notifies the user that he or she is attempting to access the network of subscriber wireless access points of the communications carrier and that he or she is not a subscriber. The user may select a time period in a selectable element 704 that he or she wishes to have access to the wireless aggregation network The user may enter payment type (eg, credit card) in a selectable element 706, such as a pull-down menu, name in a text entry field 708, and expiration date of the payment type in a selectable element 710. Software at a central location (eg, software 230 executing on server 226 of FIG. 2) may store the user's information and enable the user utilizing a wireless device to have access to the subscriber network for the selected time period. At the end of the time period, the user may be prompted with another webpage that allows the user to extend the time period or become a subscriber of the consumer subscriber network It should be understood that similar interfaces may be provided to the user if aggregate wireless communications are available to the user. In other words, a webpage may enable a consumer or commercial subscriber and/or non-subscriber to use aggregate wireless communications, if the user has not previously established parameters on his or her wireless device.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for enabling commercial subscribers of a first communications carrier to communicate over wireless access points hosted by a second communications carrier, said system comprising:
   a first storage unit configured to store at least one first database including information identifying subscribers and associated subscriber subscription agreements of a first communications carrier;
   a second storage unit configured to store at least one second database including information identifying subscribers and associated subscriber subscription agreements of a second communications carrier;
   a first network of wireless access points associated with first subscribers of the first communications carrier;
   a second network of wireless access points associated with second subscribers of the second communications carrier, at least one of the subscription agreements enabling the first subscribers to access said second network of wireless access points of the second subscribers of the second communications carrier to communicate over a communications network; and
   a first computing system in communication with said first storage unit and first network of wireless access points of the first subscribers;
   a second computing system in communication with said second storage unit, first computing system, and second network of wireless access points, said second computing system configured to:
      receive a request signal from a wireless device of a user via a wireless access point within said second network of wireless access points of second subscribers to communicate over the communications network;
      query the at least one second database stored in said second storage unit to determine whether the user is a second subscriber of the second communications carrier;
      in response to determining that the user is not a second subscriber, communicate with said first computing system to determine whether the user is a first subscriber having a subscription agreement enabling the first subscriber to communicate over the communications network via said second network of wireless access points of second subscribers; and
      enable the wireless device to access the wireless access point in response to determining that the user is a first subscriber having a subscription agreement enabling communication over the communications network via said second network of wireless access points of second subscribers.

2. The system according to claim 1, wherein said first computing system is configured to:
   receive a second request signal from a second wireless device of a second user via a wireless access point within said first network of wireless access points of first subscribers to communicate over the communications network;
   query the at least one first database stored in said first storage unit to determine whether the second user is a first subscriber of the first communications carrier;
   in response to determining that the second user is not a first subscriber, communicate with said second computing system to determine whether the second user is a second subscriber having a subscription agreement enabling the second subscriber to communicate over the communications network via said first network of wireless access points of first subscribers; and
   enable the second wireless device to access the wireless access point in response to determining that the second user is a second subscriber having a subscription agreement enabling communication over the communications network via said first network of wireless access points of first subscribers.

3. The system according to claim 1, wherein said second computing system is further configured to query the wireless device for a user ID and a password.

4. The system according to claim 3, wherein said first computing system is further configured to query the at least one first database to determine whether the user ID and password are stored in the at least one first database and related to a first subscriber having a subscription agreement enabling access to the communications network via wireless access points of the second subscribers.

5. The system according to claim 1, wherein said first computing system is further configured to determine whether the user of the wireless device has a subscription agreement to communicate with multiple wireless access points to aggregate bandwidth therefrom.

6. The system according to claim 1, wherein the wireless device is a personal computer.

7. The system according to claim 1, wherein a second wireless device of a second subscriber has priority when communicating with a wireless access point of a second subscriber over wireless devices of first subscribers communicating with the wireless access point of the second subscriber.

8. The system according to claim 1, wherein the wireless access points are configured with a private communications interface and a public communications interface, the wireless device communicating with the public communications interface of at least one of the wireless access ports.

9. The system according to claim 1, wherein said second computing system is further configured to:
   determine that a second signal received from a second wireless device is not from a subscriber of the first and second communications carriers; and
   query the wireless device to determine whether a second user of the second wireless device is willing to pay an access fee for communicating with the wireless access point of a second subscriber.

10. The system according to claim 9, wherein said second computing system is further configured to provide access to the communications network via said second network of wireless access points for a duration of time selected by the second user.

11. A method for enabling commercial subscribers of a first communications carrier to communicate over wireless access points of subscribers hosted by a second communications carrier, said method comprising:

receiving a request signal from a wireless device of a user via a wireless access point within a first network of wireless access points of first subscribers to communicate over the communications network;

determining whether the user is a first subscriber of the first communications carrier;

in response to determining that the user is not a first subscriber, determining whether the user is a second subscriber having a subscription agreement enabling the second subscriber to communicate over the communications network via the first network of wireless access points of first subscribers; and enabling the wireless device to access the wireless access point in response to determining that the user is a second subscriber having a subscription agreement enabling communication over the communications network via said first network of wireless access points of first subscribers.

12. The method according to claim 11, further comprising:

receiving a second request signal from a second wireless device of a second user via a wireless access point within a second network of wireless access points of second subscribers to communicate over the communications network;

querying at least one second database to determine whether the second user is a second subscriber of a second communications carrier;

in response to determining that the second user is not a second subscriber, determining whether the second user is a first subscriber having a subscription agreement enabling the first subscriber to communicate over the communications network via the second network of wireless access points of second subscribers; and enabling the second wireless device to access the wireless access point in response to determining that the second user is a first subscriber having a subscription agreement enabling communication over the communications network via the second network of wireless access points of second subscribers.

13. The method according to claim 11, further comprising querying the wireless device to determine a user ID and password of the first subscriber.

14. The method according to claim 13, further comprising querying the at least one first database to determine whether the user ID and password are stored therein and related to a first subscriber having a subscription agreement enabling access to the communications network via wireless access points of first subscribers.

15. The method according to claim 11, further comprising determining whether the user of the wireless device has a subscription agreement to communicate with multiple wireless access points to aggregate bandwidth therefrom.

16. The method according to claim 11, further comprising prioritizing communications of the wireless device when communicating with a home wireless access point of the first subscriber over other wireless devices communicating with the home wireless access point of the first subscriber.

17. The method according to claim 11, further comprising receiving communications from the wireless device from a public communications interface of at least one of the wireless access points having a private communications interface and a public communications interface of the first subscribers.

18. The method according to claim 11, further comprising:

determining that a second signal received from a second wireless device is not from a first subscriber of the first communications carrier; and querying the second wireless device to determine whether a second user of the second wireless device is willing to pay an access fee for communicating over the communications network via the first network of wireless access points of first subscribers of the first communications carrier.

19. The method according to claim 18, further comprising providing access to the communications network via the first network of wireless access points for a duration of time selected by the second user.

* * * * *